(12) United States Patent
Kanade et al.

(10) Patent No.: US 7,653,216 B2
(45) Date of Patent: Jan. 26, 2010

(54) POLYHEDRON RECOGNITION SYSTEM

(75) Inventors: Takeo Kanade, Pittsburgh, PA (US);
Taku Osada, Wako (JP)

(73) Assignees: Carnegie Mellon University, Pittsburgh, PA (US); Honda Motor Co., Ltd., Tokyo (JP)

( * ) Notice: Subject to any disclaimer, the term of this patent is extended or adjusted under 35 U.S.C. 154(b) by 1241 days.

(21) Appl. No.: 10/743,299

(22) Filed: Dec. 23, 2003

(65) Prior Publication Data
US 2005/0135680 A1    Jun. 23, 2005

(51) Int. Cl.
*G06K 9/00*   (2006.01)
*G06K 9/46*   (2006.01)

(52) U.S. Cl. .................. 382/106; 382/190; 382/103; 382/159; 382/153; 382/154

(58) Field of Classification Search ............... 382/100, 382/103, 106, 159, 153, 154, 190, 195, 107
See application file for complete search history.

(56) References Cited

U.S. PATENT DOCUMENTS 5,378,969 A * 1/1995 Haikawa ............. 318/568.12

FOREIGN PATENT DOCUMENTS

| JP | 05-223549 | * | 5/2001 |
|---|---|---|---|
| JP | 3192736 | | 5/2001 |
| JP | 2003-269917 | | 9/2003 |

OTHER PUBLICATIONS

Japanese Office Action dated Oct. 6, 2009.

* cited by examiner

*Primary Examiner*—Wesley Tucker
(74) *Attorney, Agent, or Firm*—Squire, Sanders & Dempsey, LLP

(57) ABSTRACT

A polyhedron recognition system that is not easily affected by the camera position and camera range when the shape of a staircase or other polyhedron is recognized from an image obtained by photography, and that can also recognize the shape with good accuracy. In the system, predetermined regions (staircase candidate regions) within the image input from two CCD cameras are selected, and a range image is obtained stereoscopically with the two cameras, while also a candidate region upon the range image obtained based on the selected region is set, and the shape of the staircase or other polyhedron is recognized based on the set range image within the candidate region.

15 Claims, 13 Drawing Sheets

POLYHEDRON RECOGNITION SYSTEM

BACKGROUND OF THE INVENTION

1. Field of the Invention

This invention relates to a polyhedron recognition system, and more particularly to a system that recognizes polyhedron object or an object whose shape can be approximated by a polyhedron (hereinafter simply referred to as "polyhedron") such as staircases and other polyhedrons based on a photographic image.

2. Description of the Related Art

With reference to Japanese Patent No. 3192736 (paragraphs 0011-0022, FIG. 4, etc.), in this related art, a group of surfaces of a predetermined surface area is extracted from an image and recognized, so recognition may be difficult unless the staircase is photographed from the front and at close range. In addition, the shape of the staircase is not recognized in detail.

SUMMARY OF THE INVENTION

One object of the invention is therefore to overcome this problem of the related art and provide a polyhedron recognition system that, when recognizing the shape of staircases and other polyhedrons from a photographic image, it is less affected by the camera position and camera range, and can recognize even details of the shape of a staircase.

In order to overcome this problem, the first aspect of the present invention provides a polyhedron recognition system that recognizes the shape of a staircase or other polyhedron based on images input from photographic means, comprising: at least one camera as said photographic means, region selection means for selecting a predetermined region to be processed further for detailed analysis within images photographed by said camera, processing region setting means for obtaining a range image (range information) from images obtained by said camera and for setting a processing region upon said obtained range image based on said selected region, and polyhedron shape recognition means for recognizing the shape of said polyhedrons based on said range image within said set candidate range.

Together with selecting predetermined or candidate region within image photographed by the camera, processing region is set upon the range image (range information, more specifically table data that indicates range information) obtained with the cameras based on the selected regions, and the shapes of the polyhedrons are recognized based on range image within the set processing region. In other words, the processing region is limited as much as possible using two-dimensional image information, which is easier to process than three-dimensional image information, and also the recognition of the shapes of polyhedrons is performed based on range image within these limited processing region. Thereby, the processing region is limited, so even when recognition is performed by means of three-dimensional model matching, for example, and it is thus less affected by the camera position and camera range, and also it can recognize even details of the shape of a polyhedron with good accuracy, depending on the accuracy of the cameras. Here, the word "shape" of a polyhedron is used in the sense of including the shape and position of the polyhedron.

In the second aspect, said photographic means comprises at least two cameras, and said region selection means selects said predetermined region within image photographed by one of said two cameras, and also said processing region setting means obtains said range image from the image obtained stereoscopically from said two cameras.

More specifically, the predetermined region is selected within an image photographed by one of said two cameras and also, the processing region is set upon a range image obtained stereoscopically from said two cameras based on the selected region, and the shape of the polyhedron is recognized based on the range image within the set candidate region, so as described in the first aspect, even when recognition is performed by means of three-dimensional model matching, for example, it is less affected by the camera position and camera range, and also it can recognize even details of the shape of a polyhedron with good accuracy, depending on the accuracy of the cameras.

In the third aspect, said region selection means extracts groups of line segments longer than a predetermined length from within said photographed image, and selects said predetermined region based on the positions of said extracted groups of line segments.

The system is constituted such that groups of line segments longer than a predetermined length are extracted from said photographed image, and region is selected based on their positions, so when the polyhedron is a staircase, for example, region can be selected based on the positions of line segments corresponding to the straight-line components that make up the staircase, and thus the region can be limited as much as possible to improve the recognition accuracy.

In the fourth aspect, said region selection means selects said predetermined region based on the positions of groups of line segments that are parallel to each other within said extracted groups of line segments, and that are groups of line segments that are close from a distance standpoint.

The system is thus constituted such that region is selected based on the positions of groups of line segments that are parallel to each other within said extracted groups of line segments, and that are groups of line segments that are close from a distance standpoint, so when the polyhedron is a staircase, for example, the position of line segments corresponding to the straight-line components that make up the staircase can be detected accurately, and thus the region can be selected based thereupon, so the regions can be limited as much as possible to improve the recognition accuracy.

In the fifth aspect, said polyhedron shape recognition means extracts sets of points constituting said range image within said processing region as sets of range data in a three-dimensional space and recognizes the shape of said polyhedron based on said extracted sets of points.

The system is thus constituted such that sets of points constituting the range image within the processing region as sets of range data are extracted in a three-dimensional space and the shape of the polyhedron is recognized based on the extracted sets of points, so by evaluating the processing region by means of three-dimensional model matching using models that indicate the shape of the polyhedron, for example, based thereupon, it is possible to efficiently recognize even details of the shape of a polyhedron with good accuracy, depending on the accuracy of the cameras.

In the sixth aspect, said polyhedron is a staircase and also said polyhedron shape recognition means assumes said extracted set of points to be an inclined plane, and thus the shape of said staircase is recognized by finding an approximate plane.

The system is thus constituted such that the polyhedron is a staircase and also the shape of the staircase is recognized by finding an approximate plane, so it is possible to evaluate the processing region by means of three-dimensional model matching using a plane model comprising an approximate plane, and it is possible to efficiently recognize even details of the shape of a polyhedron with good accuracy, depending on the accuracy of the cameras.

In the seventh aspect, said polyhedron is a staircase and also said polyhedron shape recognition means sections said extracted set of points along vertical planes, and the shape of said staircase is recognized based on the error between the sets of points on the cross-sectional planes (sections) and a two-dimensional model.

The system is thus constituted such that the polyhedron is a staircase and also the extracted set of points is sectioned along vertical planes, and the shape of the staircase is recognized based on the error between the sets of points on the cross-sectional planes and a two-dimensional model, so it is possible to even more efficiently recognize even details of the shape of a polyhedron depending on the accuracy of the cameras.

BRIEF DESCRIPTION OF THE DRAWINGS

The above and other objects and advantages of the invention will be more apparent from the following description and drawings, in which:

FIG. 19 is a histogram used to determine the initial values required in the processing of FIG. 16 and the like;

FIG. 20 is a plot similar to FIG. 19 used to determine the initial values required in the processing of FIG. 16 and the like; and FIG. 21 is an explanatory diagram showing the position and shape of the stairs recognized in the processing of FIG. 16 and the like.

DETAILED DESCRIPTION OF THE PREFERRED EMBODIMENTS

A polyhedron recognition system according to an embodiment of the invention will now be explained with reference to the drawings.

Figure 1:
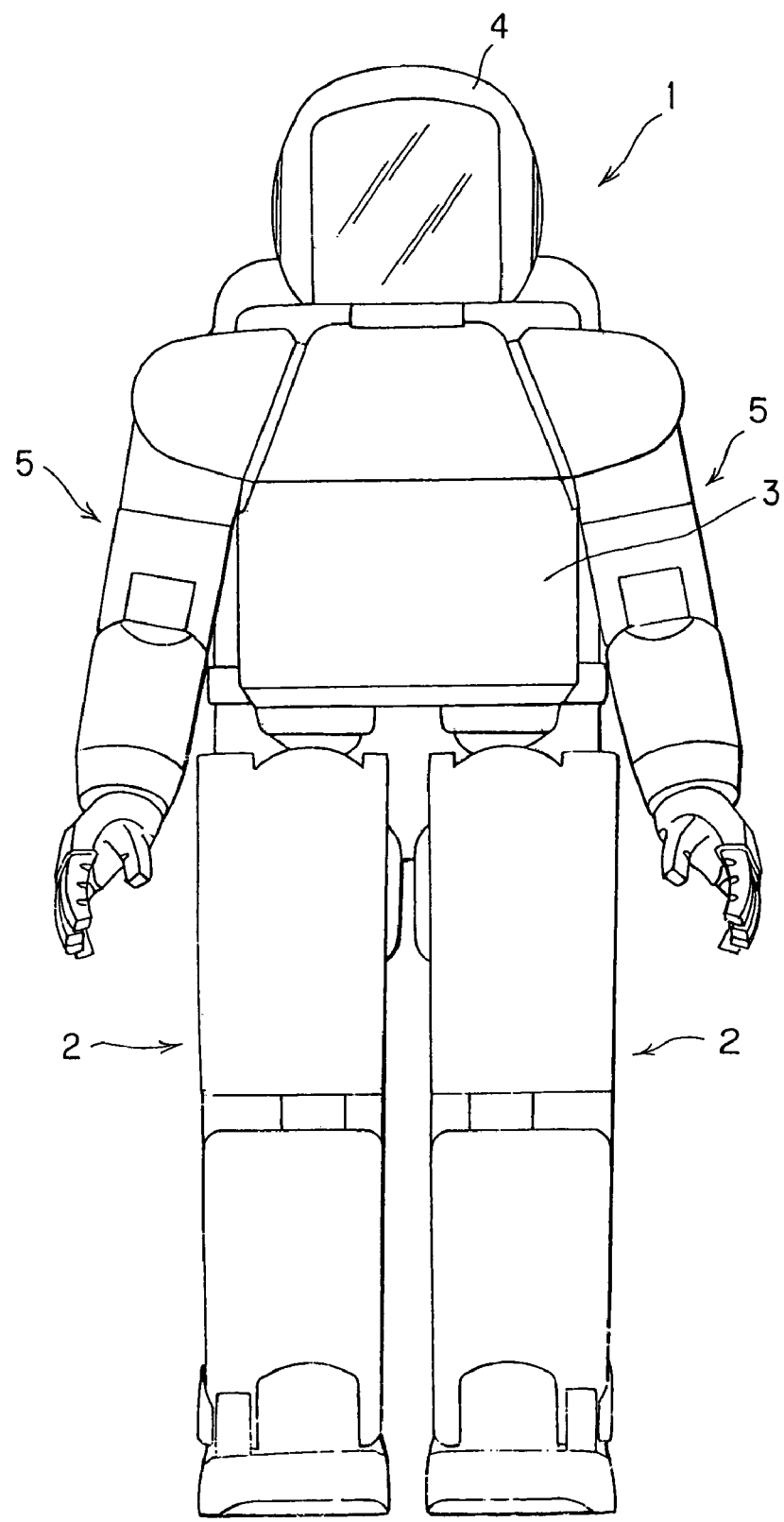
FIG. 1 is a front view of a legged walking robot in which is installed the polyhedron recognition system according to one embodiment of the present invention.
Figure 2:
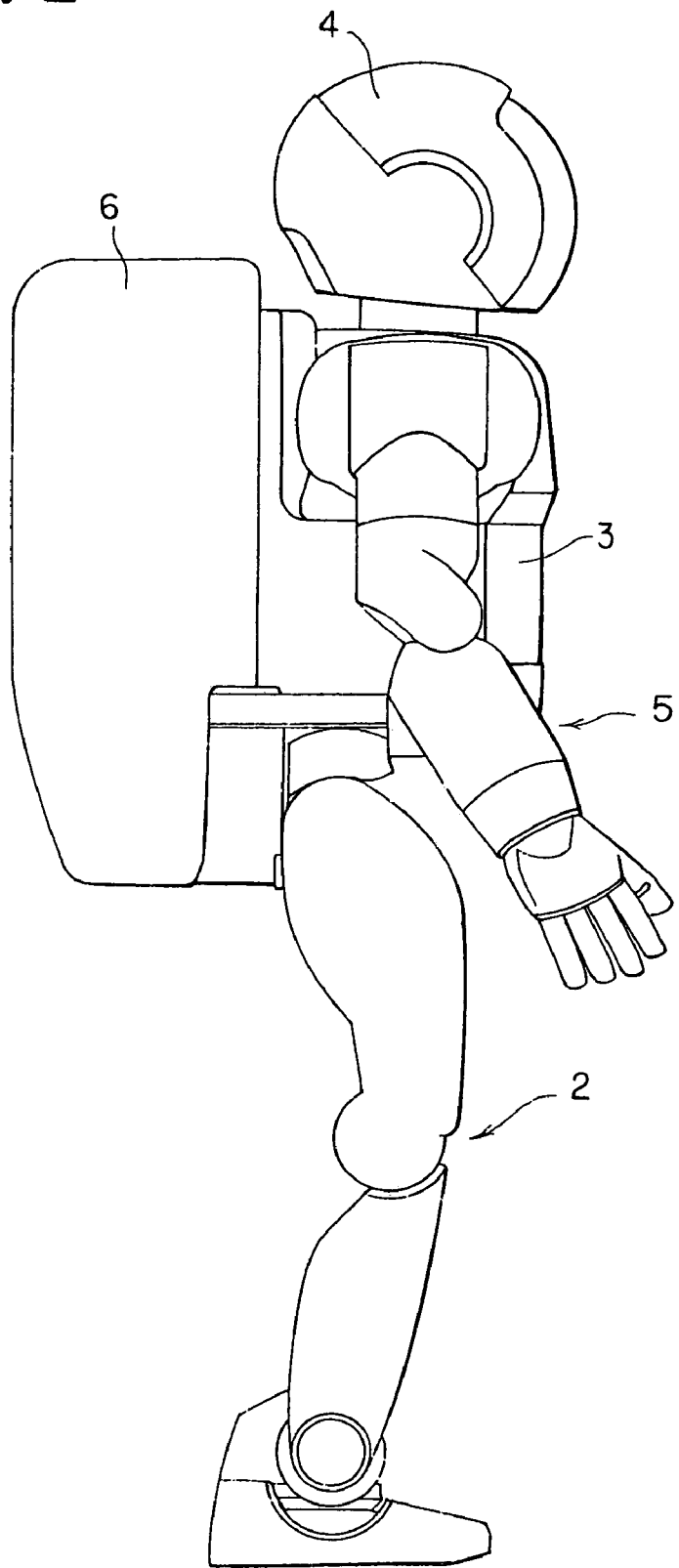
FIG. 2 is a right side view of the legged walking robot shown in FIG. 1.

Note that in this embodiment, the polyhedron recognition system is described as installed in a bipedal legged walking robot as an example. FIG. 1 is a front view of such a legged walking robot (hereinafter referred to simply as a "robot"), while FIG. 2 is a side view thereof.

As shown in FIG. 1, the robot 1 has two leg links (legs) 2 along with an upper body (trunk) 3 provided thereupon. A head 4 is provided upon the upper end of the upper body 3 and two arm links (arms) 5 are connected to either side of the upper body 3. As shown in FIG. 2, a housing unit 6 is mounted on the back of the upper body 3 for accommodating, among others, an electronic control unit (ECU; explained later), electric motors (motive power sources; explained later) that drive the joints of the robot 1, and a battery power supply (not shown). Note that the robot 1 shown in FIGS. 1 and 2 has a cover used to protect the interior structure.

The internal structure of the robot 1, primarily the joints, will now be explained with reference to FIG. 3.

As illustrated, the robot 1 has right and left leg links 2 each having six joints. The twelve joints are: joints 10R, 10L (R and L indicating the right and left sides) each for swiveling of the corresponding leg around the vertical axis (Z axis or gravity axis) at the hip, joints 12R, 12L each for rotation around the roll axis (X axis) of the hip, joints 14R, 14L each for rotation around the pitch axis (Y axis) of the hip, joints 16R, 16L each for rotation around the pitch axis (Y axis) of the knee, joints 18R, 18L each for rotation around the pitch axis (Y axis) of the ankle, and joints 20R, 20L each for rotation around the roll axis (X axis) of the ankle. Foot (feet) 22R, 22L are attached at the lower ends of the leg links 2R(L).

Thus each leg link 2 comprises the crotch (hip) joints 10R(L), 12R(L) and 14R(L), knee joints 16R(L) and ankle joints 18R(L) and 20R(L). The hip and knee joints are connected by a thigh link 24R(L) and the knee and ankle joints by a lower leg link 26R(L).

Figure 3:
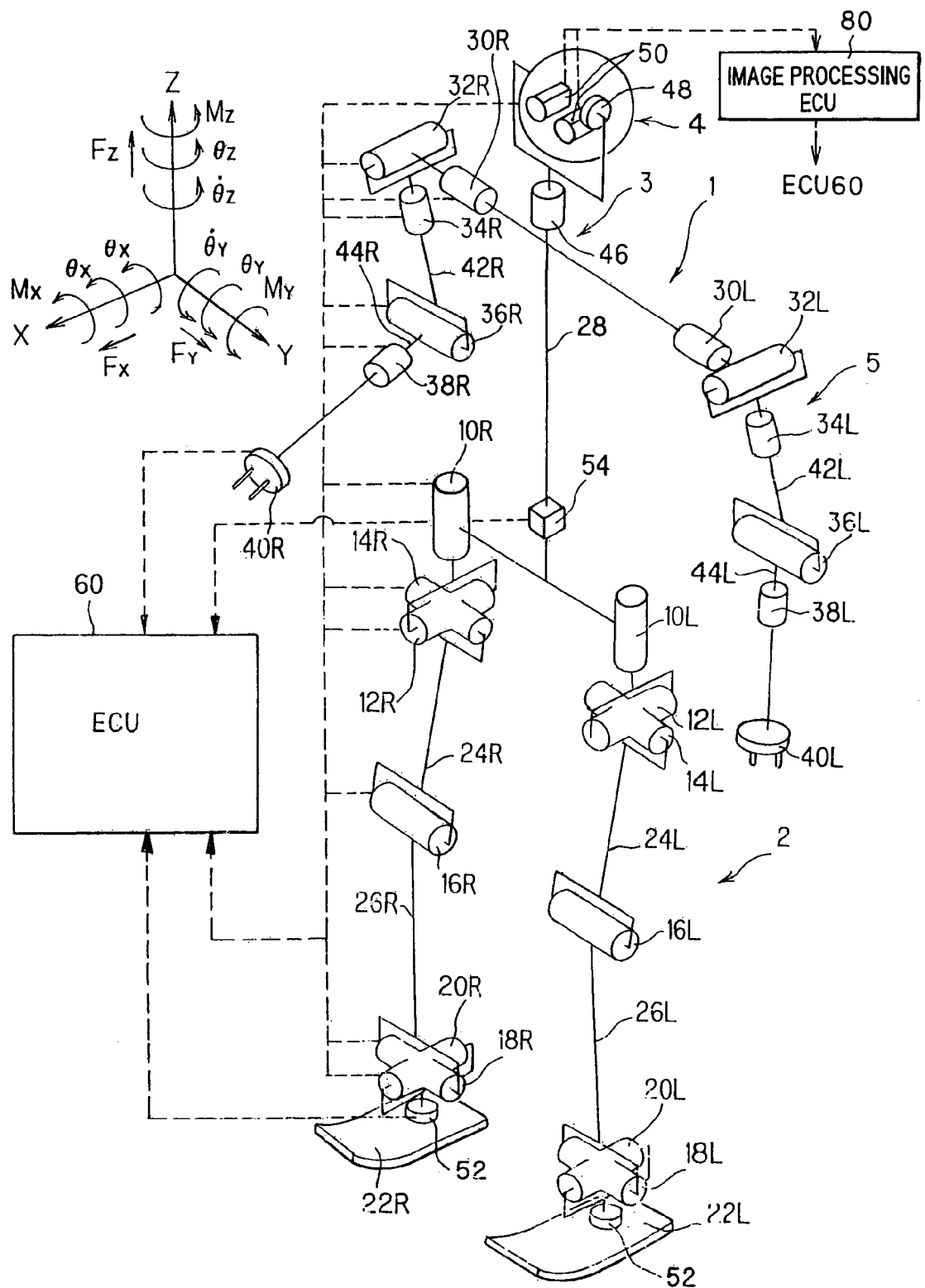
FIG. 3 is an overall schematic diagram of the internal structure of the legged walking robot shown in FIG. 1, centered on the joints.

The leg links 2 are connected through the hip joints to the upper body 3, which is represented in FIG. 3 simply by an upper body link 28. The arm links 5 are connected to the upper body 3, as already mentioned. The arm links 5 comprise joints 30R, 30L each for rotation around the pitch axis of the corresponding shoulder, joints 32R, 32L each for rotation around the roll axis of the shoulder, joints 34R, 34L each for swiveling of the arm around the gravity axis, joints 36R, 36L each for rotation around the pitch axis of the elbow, joints 38R, 38L each for swiveling of the wrist around the vertical axis. Hands (end effectors) 40R, 40L are attached to the distal ends of the wrists.

Thus each arm link 5 comprises the shoulder joints 30R(L), 32R(L) and 34R(L), and the wrist joints 38R(L). The shoulder joint and the elbow joint are connected by an upper arm link 42R(L) and the elbow joint and the wrist joint are connected by a forearm link 44R(L).

The head 4 consists of a neck joint 46 for swiveling around the vertical axis and a head rocking mechanism 48 that rotates the head 4 around an axis perpendicular to the vertical axis. In the interior of the head 4 are mounted at least two CCD cameras (cameras; photographic means) 50 positioned to the right and left for stereoscopic vision.

The CCD cameras 50 are attached to the head 4 and also the head 4 is attached to the upper body 3 via the neck joint 46 and head rocking mechanism 48, so the robot 1 can rotate the head 4 and rock it up and down to photograph the surrounding environment and move while recognizing the surroundings based on the images thus obtained. Note that each of the CCD cameras 50 has a resolution of 320×240 pixels and has a field of view of 60 degrees horizontally and 40 degrees vertically.

Returning to the description of the robot 1, owing to the foregoing configuration, the leg links 2 of the right and left legs thus have twelve degrees of freedom in total, so that during locomotion the legs as a whole can be caused to execute the desired movements by driving these 12 joints to appropriate angles. The robot is thus capable of walking freely within three-dimensional space. Each arm link 5 has five degrees of freedom. The robot 1 can therefore be operated to carry out desired jobs by driving these joints to appropriate angles.

Note that a six-axis force sensor 52 of conventional design is mounted on the foot member 22R(L) below the ankle joint. Of the external forces acting on the robot, the six-axis force sensor 52 detects the three ground reaction force components $F_x$, $F_y$ and $F_z$ and outputs the three moment components $M_x$, $M_y$ and $M_z$.

An inclination sensor 54 mounted on the upper body 3 detects inclination and angular velocity relative to the gravity axis. The outputs of the joint motors are decreased in angular velocity and increased in torque by reduction gears (explained later) and applied for moving the links 24R(L), 26R(L) etc. relative to one another. Each motor is provided with a rotary encoder (not shown in FIG. 3) for detecting the amount of motor rotation.

The electronic control unit (ECU) 60 accommodated in the housing unit 6 as mentioned earlier is a microcomputer. The outputs of the six-axis force sensor 52 etc. are sent to the ECU 60. (For simplicity of illustration, only the outputs from the right side of the robot 1 are indicated in the figure.)

Figure 4:
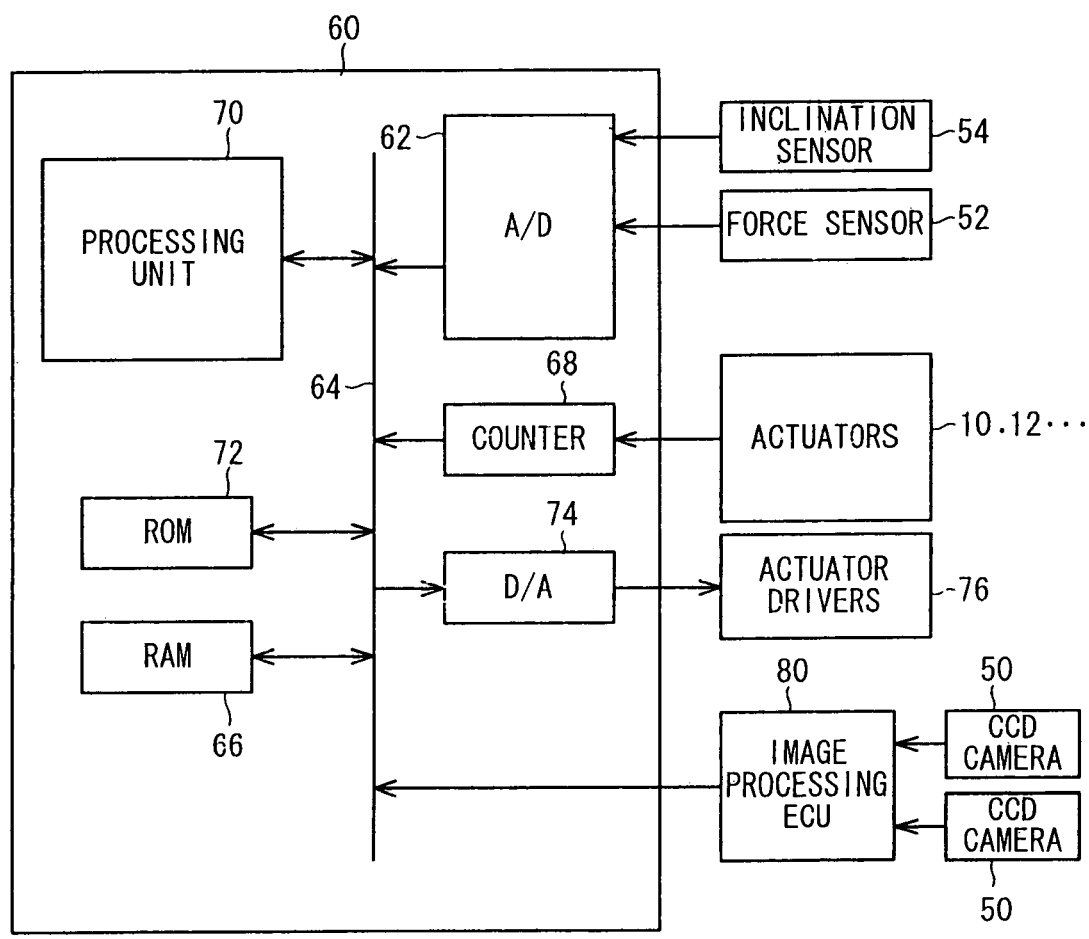
FIG. 4 is a block diagram showing details of the electronic control unit (ECU) of the legged walking robot shown in FIG. 3, including the polyhedron recognition system according to this embodiment comprising a CCD camera and image processing ECU.

FIG. 4 is a block diagram showing details of the ECU 60. As shown in the figure, the ECU 60 consists of a microcomputer. Here, the outputs from the inclination sensor 54 etc. are converted to digital values by an analog-to-digital (A/D) converter 62, and this output is sent to RAM 66 via a bus 64. The outputs of encoders disposed adjacent to the electric motors in the various joints are input to the RAM 66 via a counter 68.

In the ECU 60 is provided a processing unit 70 comprising a CPU. The processing unit 70 calculates the manipulated variables (control inputs) required to drive the various joints based on data stored in ROM 72 and sensor outputs, and provides output of these values via a digital-to-analog (D/A) converter 74 and actuator drives (amps) 76 to the electric motors that drive the various joints.

The monochrome images (output) obtained from each of the two (right and left) CCD cameras 50 are sent to the image processing ECU 80 where image processing including the stage of recognition of polyhedrons and the like to be described later is performed. The output of the image processing ECU 80 is input to the ECU 60.

As described above, the polyhedron recognition system according to this embodiment consists of the CCD cameras 50 and image processing ECU 80 as requisite components.

Figure 5:
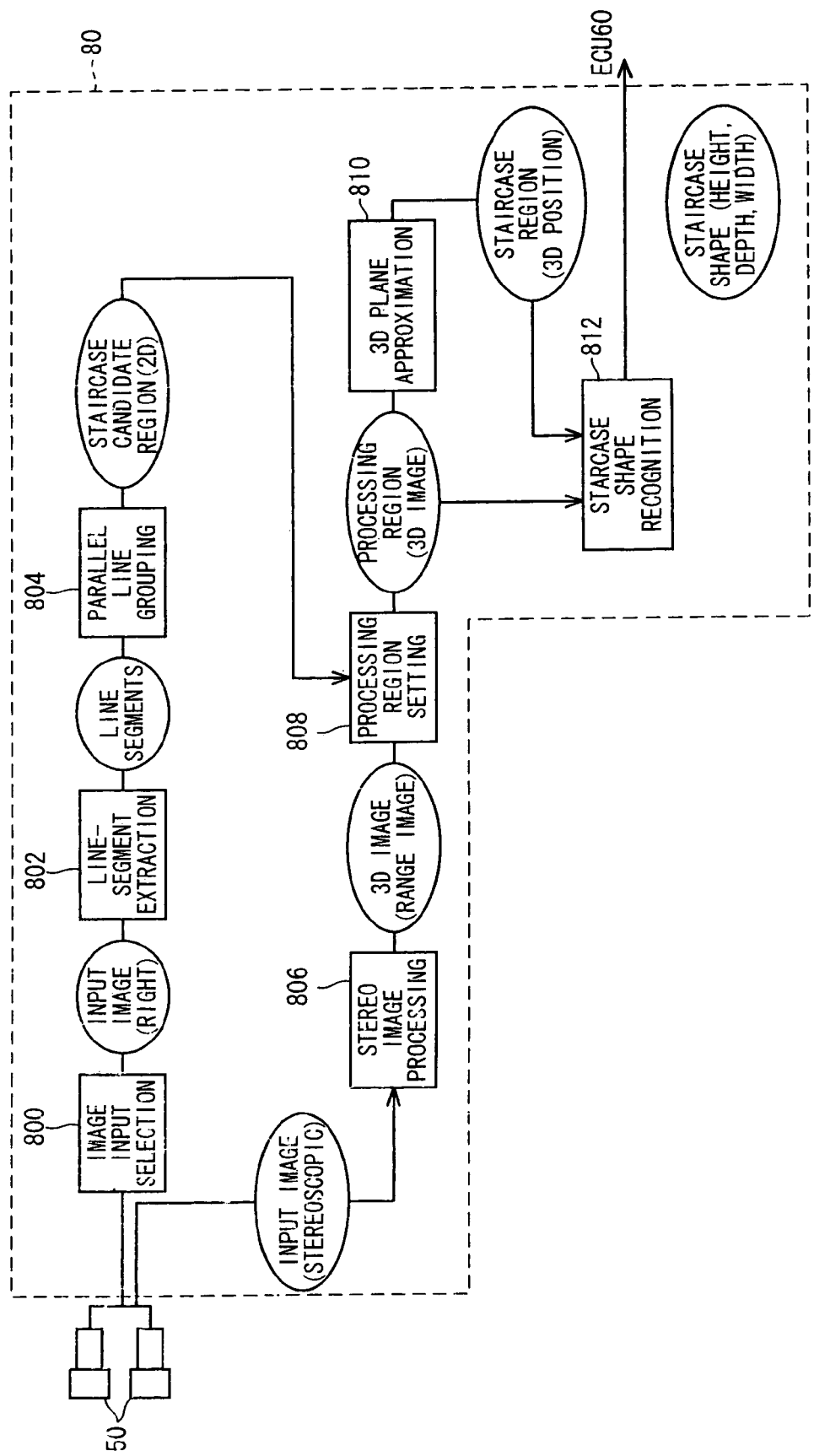
FIG. 5 is a functional block diagram showing the operation or processing according to this embodiment which is performed by the image processing ECU 80 shown in FIG. 4.

FIG. 5 is a functional block diagram showing the polyhedron recognition operation of the image processing ECU 80, namely the operation of the polyhedron recognition operation according to this embodiment.

Here follows a description made with reference to the figure.

The image processing ECU 80 is provided with an image input selection block 800. The image input selection block 800 accepts input of the images photographed by the two (right and left) CCD cameras (stereo cameras) 50 and can also select an image photographed by one of the CCD cameras, for example the right one.

Figure 6:
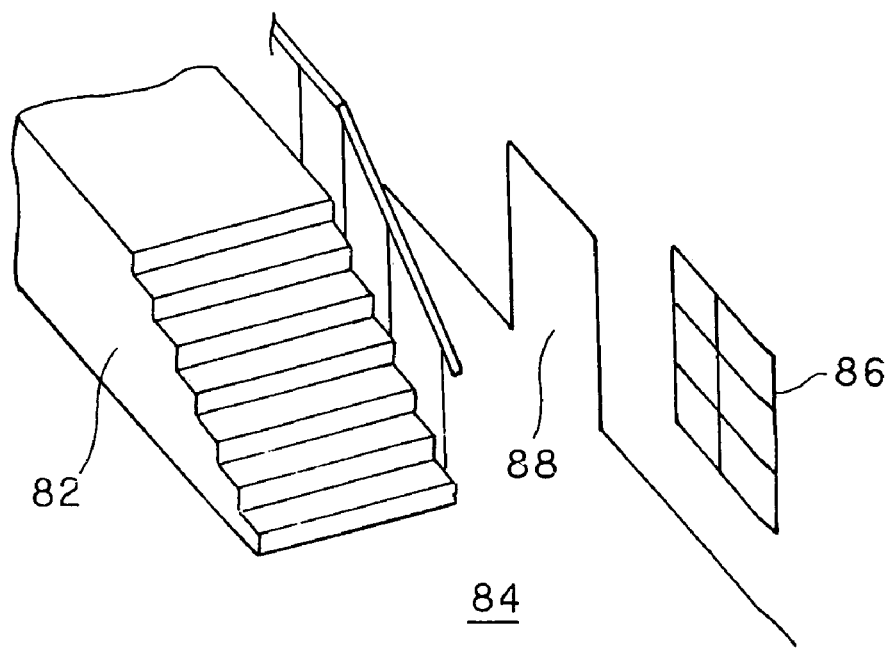
FIG. 6 is an explanatory diagram showing the environment photographed by the CCD camera shown in FIG. 4.

FIG. 6 is an explanatory diagram showing the environment photographed by CCD camera 50, namely the environment in which the robot 1 moves. As shown in the figure, a staircase 82 which is a polyhedron comprising flat surfaces is present there and the robot 1 is moving along a hallway (floor) 84 toward the staircase 82. A window 86 and door 88 are present to the right of the hallway 84.

Figure 7:
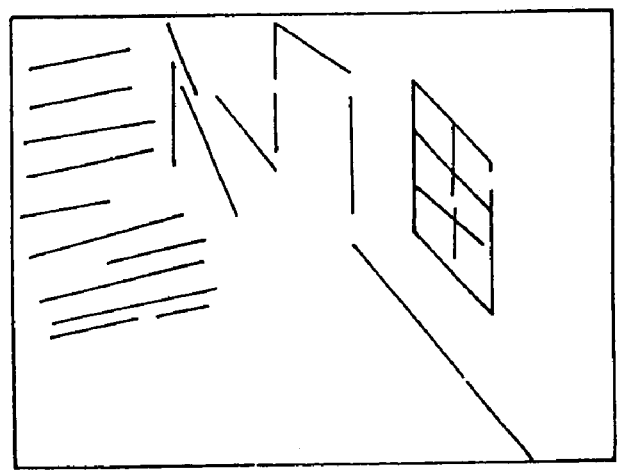
FIG. 7 is an explanatory diagram showing the line-segment elements (image) extracted by the line-segment extraction block of FIG. 5.

Here follows a description of the processing illustrated in FIG. 5. The black and white grayscale image (not shown) input from the right-side camera via the image input selection block 800 is sent to a line-segment extraction block 802, where a known differential edge extraction operator is used to extract the pixels with a large variation in optical density within the image. Next, among the edge pixels thus extracted, those that line up in a straight line are connected to extract line segment elements (comprising straight lines) as two-dimensional image information. FIG. 7 shows the extracted line-segment elements.

Figure 8:
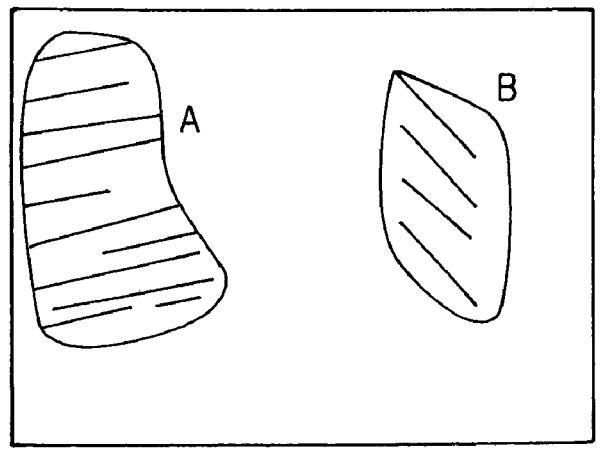
FIG. 8 is an explanatory diagram showing groups of parallel lines obtained by means of the parallel line grouping block of FIG. 5.

The extracted line-segment information is then sent to a parallel line grouping block 804, where from among the extracted group of line segments are extracted those line segments that have the relationship of being parallel lines and are nearby from the standpoint of range, and the selected groups of parallel lines are considered (selected as being) a staircase candidate region(s) (the aforementioned predetermined region). FIG. 8 shows the groups of parallel lines A and B thus obtained. The groups of parallel lines (staircase candidate region(s) are also shown as two-dimensional image information (2D images).

On the other hand, in the image processing ECU 80, after input of the stereoscopic images obtained from the right and left CCD cameras 50, they are sent to a stereo image processing block 806 where a range image (3D image; specifically table data that indicates range information) is obtained (calculated). The range image thus obtained is sent to a processing region setting block 808, where the processing region(s) upon the range image are set based on the staircase candidate regions (2D image) described above.

Figure 9:
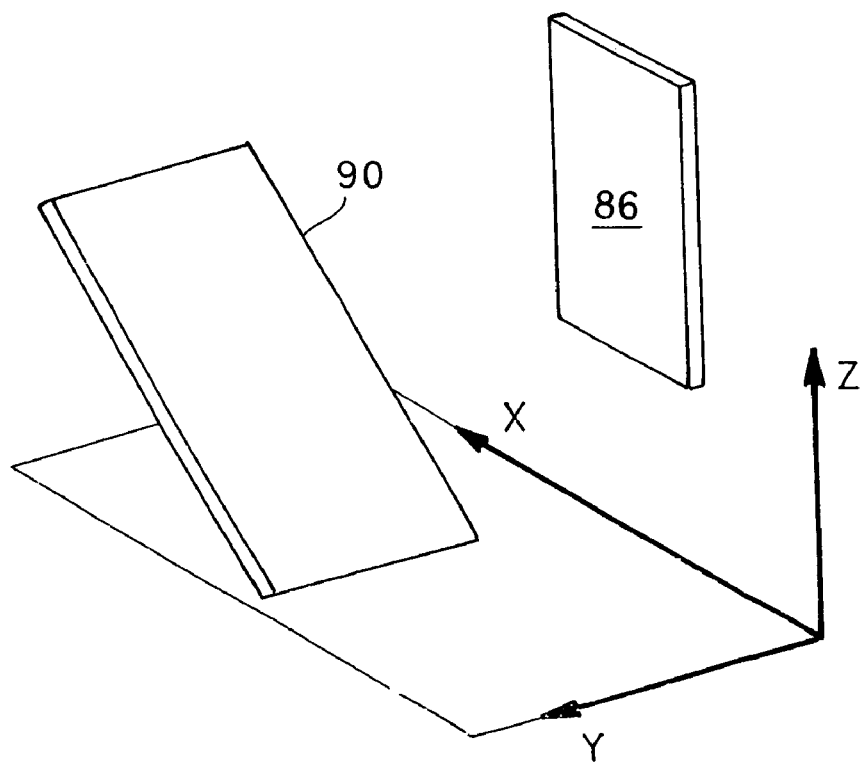
FIG. 9 is an explanatory diagram showing the operation of the three-dimensional plane approximation block of FIG. 5.

The processing regions (staircase candidate regions) include the frames of windows 86 and other structures with many parallel lines, so the range images (3D images) within the processing regions (staircase candidate regions) thus set are sent to a 3D plane approximation block 810, where staircase regions are found as positions in three-dimensions (3D). Specifically, as shown in FIG. 9, a plane model 90 is fit to the three-dimensional sets of points (3D image data) within the processing regions and a decision is made as to whether or not it is a staircase based on its slope.

The information regarding staircase regions as three-dimensional sets of points within the processing regions and positions in three-dimensions (3D) thus obtained are sent to a staircase shape recognition block 812.

The staircase shape recognition block 812 uses the range image thus input to determine whether the range from the camera position (position of the CCD cameras 50) to the staircase (distance in the X direction shown in FIG. 9) is too far or not, or whether the resolution of the input image is too low or not, and if so, halts processing. If this is not the case, the three-dimensional sets of points (3D image data) of the processing regions are fit to a staircase model 92 (shown in FIG. 10), where the positions and shapes (height, depth) of the stairs of the staircase 82 are calculated and also, the width of the staircase 82 is calculated from the distribution of three-dimensional sets of points matching the staircase model.

Here follows a description of the individual steps.

In the processing of the parallel line grouping block 804, among the extracted sets of line segments, after those that are not very parallel are removed (constraint 1), any two of the extracted sets of line segments must lie at roughly the same angle (direction) (constraint 2), the common portions must be long (constraint 3) and the distance between them must be short (constraint 4), so combinations of pairs of line segments that satisfy these four constraints (requirements) are selected and sets of those which are connected to each other are taken to be one group. In the above, "parallel" means parallel in the XY plane of FIG. 9.

Figure 11:
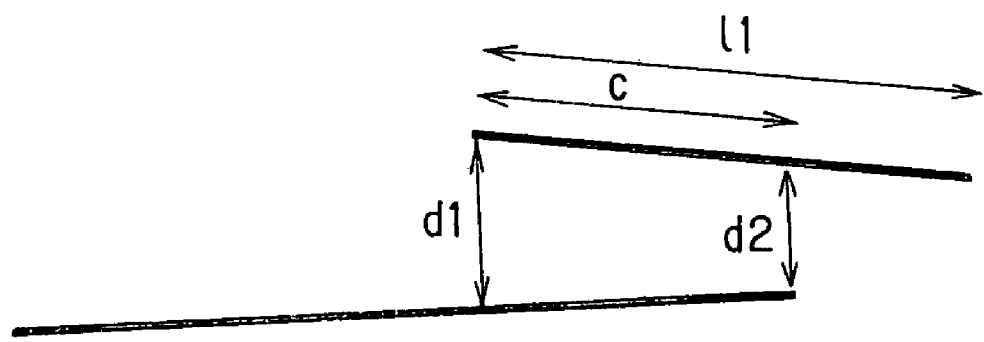
FIG. 11 is an explanatory diagram showing the processing of the parallel line grouping block of FIG. 5.

In the above, the determination of lying at roughly the same angle (direction) in constraint 2 is made based on whether the difference in angle is less than a first threshold value or not. The determination of whether or not the common portions are long in constraint 3 is made based on, as shown in FIG. 11, comparing the lengths of the line segments and determining if the common portions are long, namely whether $c/l_1$ is greater than a second threshold value or not. The determination of whether the distance between them is short as constraint 4 is made based on, as illustrated, whether the distance d between the line segments ($d=(d_1+d_2)/2$) is close compared to the length of the line segments, namely whether $d/l_1$ is less than a third threshold value or not.

If the first through third threshold values are set loosely, then line segments that are clearly not parallel and completely unrelated line segments will be selected as line segment pairs, so detection errors will increase. Conversely, if the threshold values are set too strictly, detection errors will decrease but there is a probability that the required staircase regions or portions thereof will be left out of the candidate regions.

Figure 12:
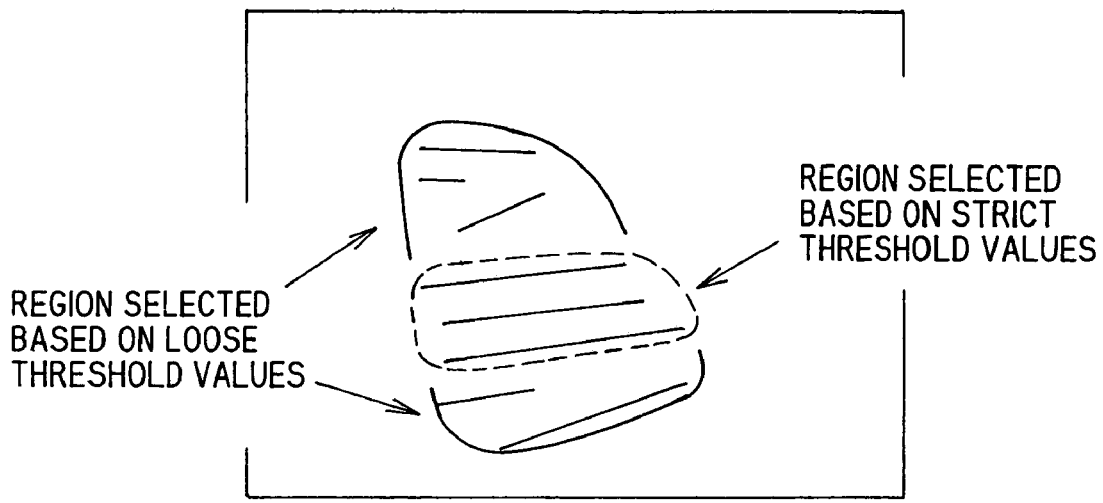
FIG. 12 is similarly an explanatory diagram showing the processing of the parallel line grouping block of FIG. 5.

To solve this problem, each of the first through third threshold values is set to two levels of values, and as shown in FIG. 12, the processing regions are first selected based on the stricter threshold values and next the selected regions are expanded using the looser threshold values. Thereby, it is possible to prevent non-staircase regions from being selected while selecting (setting) the processing regions to include the staircase regions as widely as possible.

Figure 13:
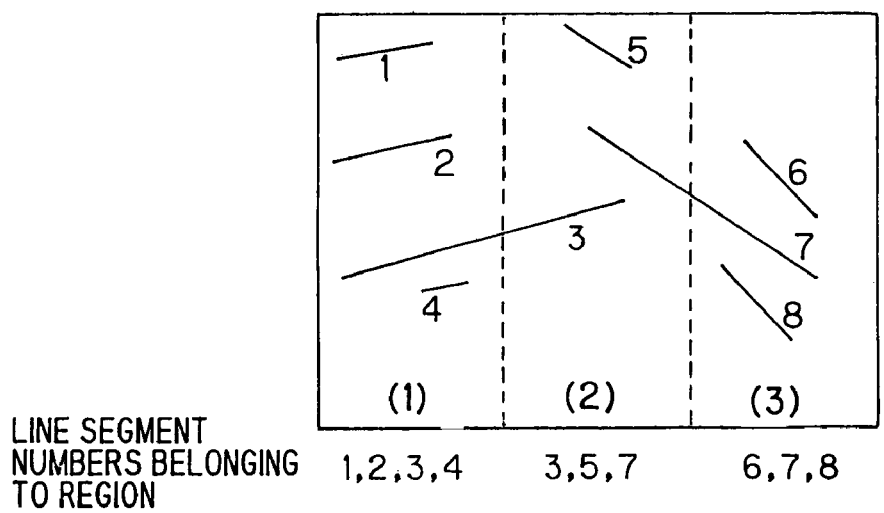
FIG. 13 is similarly an explanatory diagram showing the processing of the parallel line grouping block of FIG. 5.

Moreover, when selecting line segments with the relationship of parallel lines from among the group of extracted line segments, instead of performing this work on all line segment pairs, the number of line segment pairs to be inspected is reduced by categorizing the line segment pairs in advance as follows. To wit, as shown in FIG. 13, the image is broadly divided into n regions (in the illustrated example, three regions), each line segment is classified as to which region it belongs to and this is recorded, so only the line segment pairs belonging to the same region are compared. For example, for region (1), it is sufficient to make the decisions for only line segments (numbered) 1, 2, 3 and 4. This increases the efficiency of the work.

Here follows a description of the processing of 3D plane approximation block 810.

As shown in FIG. 8, it is difficult to distinguish a staircase 82 from a window 86 or other structure that has many parallel line segments based only on the characteristic of being parallel line segments. To solve this problem, in this embodiment these are distinguished using the characteristic of their three-dimensional shapes.

Figure 14:
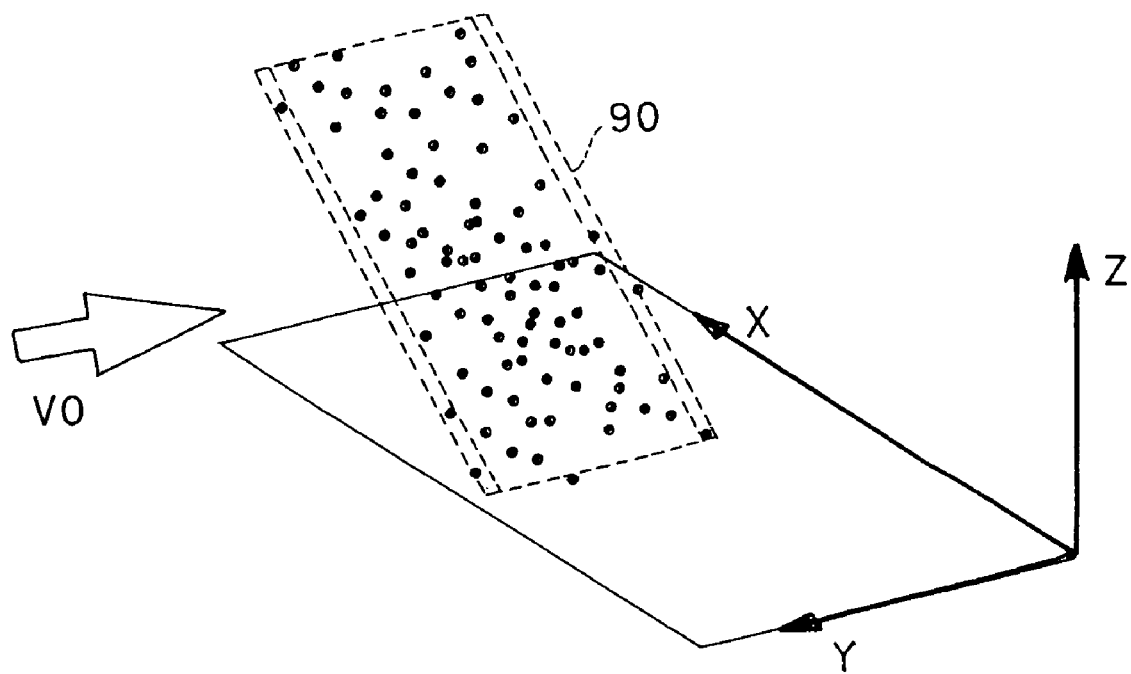
FIG. 14 is an explanatory diagram showing the operation of the three-dimensional plane approximation block of FIG. 5.

Specifically, the set of points making up the range image within the processing region (staircase region) selected from the black and white grayscale image are extracted as a set of range data in the X, Y, Z space as shown in FIG. 14. The staircase 82 has stairs so it is not exactly a plane, but it can be macroscopically assumed to be an inclined plane. In order to handle the dispersion in range data due to the stairs of the staircase 82 and measurement errors, an appropriate planar model fitting operation (e.g., the method of least squares) is used to fit the data to the plane model 90 and find its slope.

Figure 15:
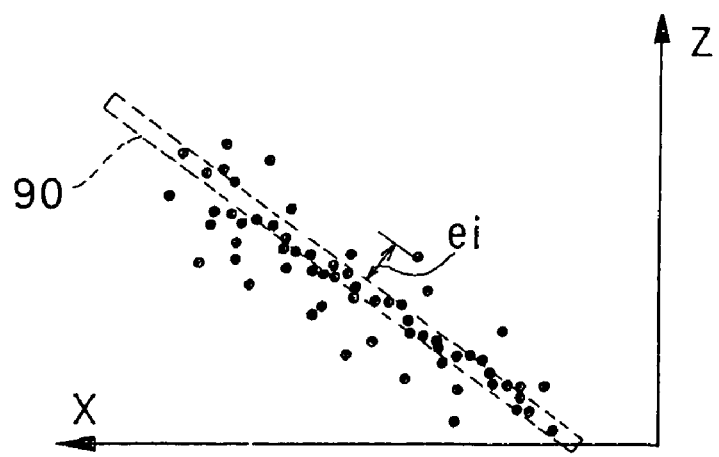
FIG. 15 is similarly an explanatory diagram showing the operation of the three-dimensional plane approximation block of FIG. 5.

For simplicity, FIG. 15 shows the case of the data projected into the XY plane from the point of view $V_0$. The individual three-dimensional sets of points thus measured have a certain amount of dispersion due to the staircase shape and measurement errors as illustrated, but the parameters of the plane model 90 are calculated so that the distance $e_i$ ($i=1, \ldots, n$) from the approximate plane becomes smaller in some sense.

By examining the slope of the fitted plane model 90 as shown in FIG. 9, a staircase can be easily distinguished from (the pattern of) a window or wall or the like.

Here follows a description of the processing of staircase shape recognition block 812.

Figure 10:
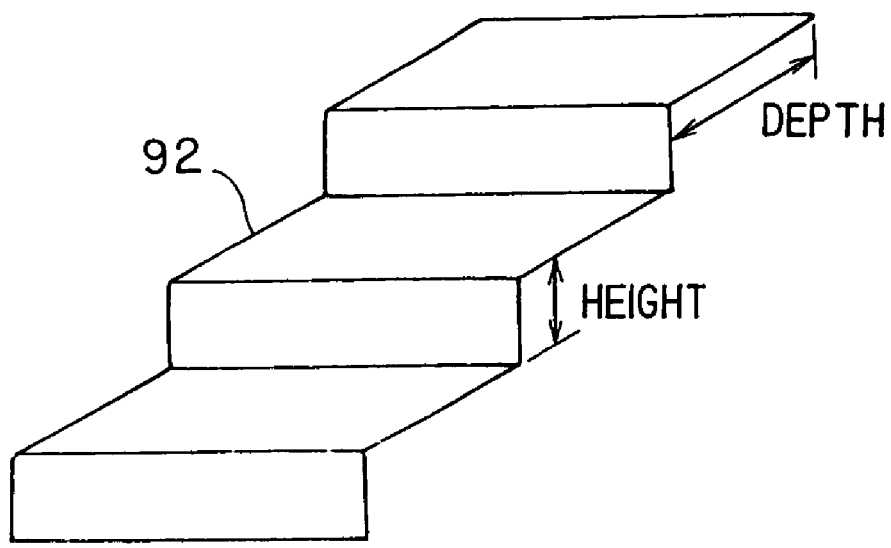
FIG. 10 is an explanatory diagram showing a staircase model used in the staircase shape recognition block of FIG. 5.

First, the staircase model 92 shown in FIG. 10 as described above is set up. In the staircase model 92, one stair consists of two planes, one horizontal and one vertical, and the staircase consists of a plurality connected units of these stairs. In the same manner as the processing of the 3D plane approximation block 810, this staircase model is fit to the three-dimensional set of points, thereby recognizing the closest-fitting position, direction, height and depth as stairs. However, considering that there is a total of eight degrees of freedom including three degrees of freedom in position, three degrees of freedom in rotation, and two degrees of freedom in height and depth, eight degrees of freedom are too many degrees of freedom to be handled as a model-fitting problem, so the problem is divided up as follows.

Figure 16:
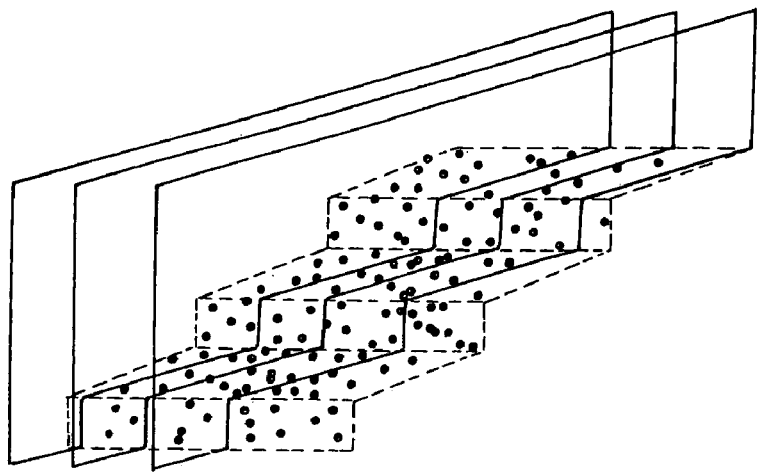
FIG. 16 is similarly an explanatory diagram showing the operation of the three-dimensional plane approximation block of FIG. 5, illustrating the processing of extracting the cross-sectional surface from a three-dimensional set of points of the positions of stairs.
Figure 17:
FIG. 17 is an explanatory diagram showing the set of points in the cross-sectional surface obtained from the process of FIG. 16.

To wit, as shown in FIG. 16, the staircase positions are extracted by projecting a set of 3-dimensional points onto cross-sectional planes. Specifically, a plurality of planes (XZ planes) perpendicular to the floor is used to section the three-dimensional set of points at certain intervals, thus collecting them into three-dimensional sets of points nearest the planes. FIG. 17 shows a set of points on the cross-sectional planes thus collected.

Figure 18:
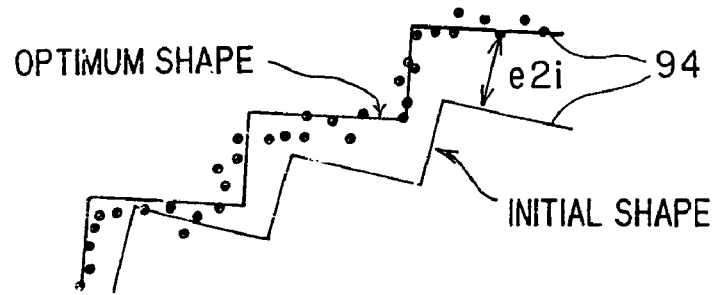
FIG. 18 is an explanatory diagram showing the mapping of the cross-sectional surface shown in FIG. 17 to a two-dimensional staircase model.

These sets of points can be assumed to be nearly two-dimensional data, so a two-dimensional staircase model (cross-section model) 94 is fit to the data. As shown in FIG. 18, considering the distance $e_{2i}$ ($i=1, \ldots, n$) from each data point to the nearest point on the staircase model to be the error with respect to one measurement point, the model is allowed to converge so as to minimize the sum of the errors in an appropriate sense using the method of least squares, for example. The two-dimensional staircase model 94 has a total of five degrees of freedom including two degrees of freedom in position, one degree of freedom in rotation, and two degrees of freedom in height and depth, since the model fit is done in the two-dimensional space rather than the original 3-dimensional space, it can be computed in a realistic amount of time.

In this case, appropriate initial values must be set. Thus, in order to estimate the rough positions and intervals between steps, the cross-sectional plane data of FIG. 17 is projected into the horizontal and vertical directions, and histograms are created for each.

Figure 19:
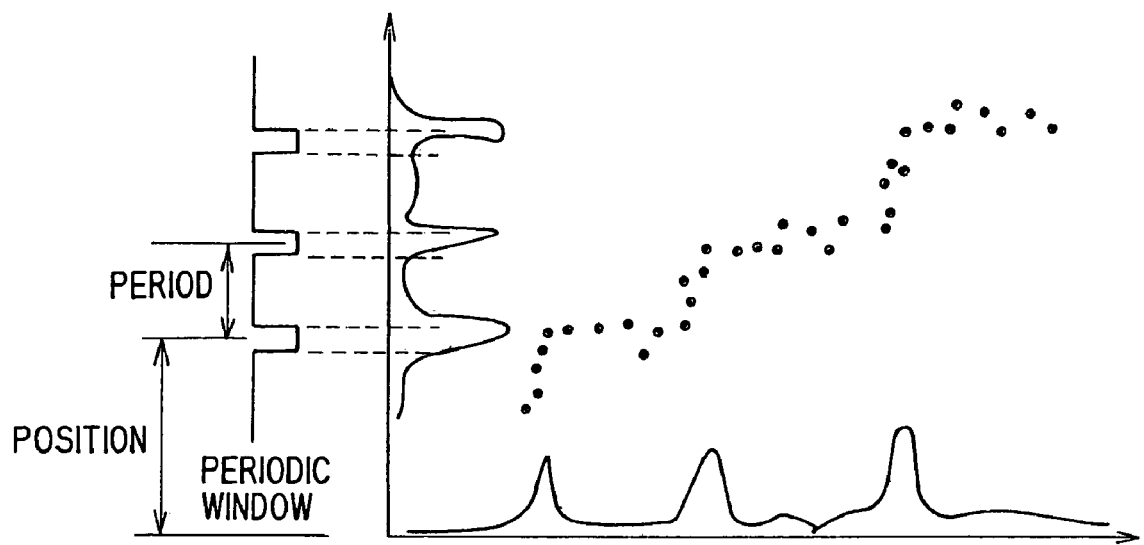

FIG. 19 shows the histograms thus obtained. The largest numbers of data points are present at the positions of the stairs, so peaks appear in the histograms, and these peaks should appear with the same periodicity in the height and depth. Thus, a periodic window such as that shown on the vertical axis of FIG. 19 is set and the position and period are varied to find the position and period where the sum of the histogram within the window is a maximum, and this position and period is the height of one step. The same is done for the position and depth in the horizontal direction.

Figure 20:
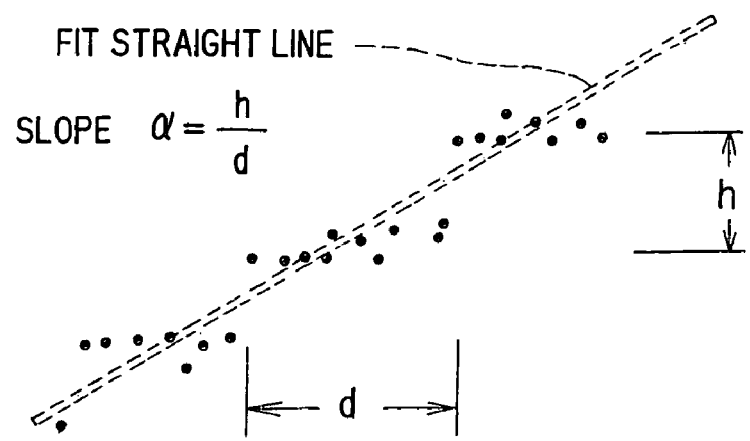

Note that in the case of a staircase that has no vertical walls, the horizontal axis in FIG. 19 will have no histogram peak, as shown in FIG. 20, the data point sequence is fit to straight lines. Taking a to be the slope, h to be the height found from the vertical histogram described in FIG. 19, the depth d can be found by $d=h/\alpha$.

Figure 21:
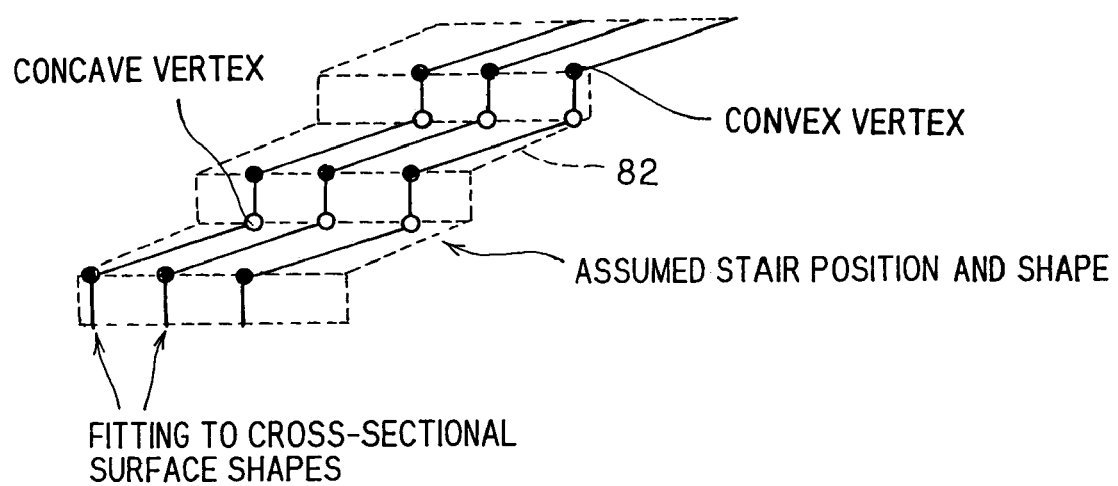

By selecting the convex vertices and concave vertices from the plurality of cross-sectional surface shapes thus found, and connecting the vertices having the same height, it is possible to find the position and shape of the staircase 82 as shown in FIG. 21.

Note that regarding the width of the staircases 82, from sets of the three-dimensional points, only a set of points that are sufficiently close to the fitted plane model 90 (explained with respect to FIG. 14, etc.) must be selected, and other isolated or noisy points must be removed.

This embodiment is constituted as described above and is thus not easily affected by the camera position and camera range, and also the details of the shape of the stairs can be recognized with good accuracy, while the position can also be recognized.

To wit, while parallel lines are an effective characteristic for recognizing a staircase 82, man-made environments such as offices and homes through which the robot 1 moves also include many other structures having the characteristic of straight lines, parallel lines or combinations of parallel lines. In addition, while an inclined-plane shape is characteristic of a staircase, in order for the recognition of shapes based on model matching to work well, it is necessary to limit the processing areas or regions as much as possible. The reason is that the recognition of three-dimensional shapes involves high processing costs and that in addition, when objects comprising a plurality of planes or the like are present within the candidate regions, they will become noise with respect to each other, preventing to obtain good results.

To solve this problem, it is configured to limit the processing areas or regions with two-dimensional image processing (grouping of parallel lines) and also evaluate the details of limited regions by means of three-dimensional model matching using plane models and staircase models of stereoscopically obtained range images (range information, more specifically table data that indicates range information).

To wit, the processing regions are limited as much as possible, so it has the advantage of being resistant to the effects of the camera position and camera range and also the limited processing regions are evaluated in detail with three-dimensional model matching. Thereby, it is possible to recognize the shape and positions of details of the staircases with good accuracy, depending on the accuracy of the CCD cameras 50, or in other words, it is possible to recognize the shape and position of details of the staircase up to the limit of the accuracy of the CCD cameras 50 provided.

Accordingly, when installed in a robot 1, it is able to recognize the position and shape of a staircase 82 present in a hallway 84 within the movement space.

In this manner, this embodiment is configured to have a polyhedron recognition system (image processing ECU 80) that recognizes the shape of a staircase 82 or other polyhedron based on an image input from photographic means, comprising: at least one camera (CCD camera 50) as said photographic means, region selection means for selecting a predetermined region (staircase candidate region) to be processed further for detailed analysis within image photographed by said camera (line-segment extraction block 802, parallel line grouping block 804), processing region setting means for obtaining a range image (range information, more specifically table data that processing range information) from image obtained by said camera and for setting a processing region upon said obtained range image based on said selected region (processing region setting block 808), and polyhedron shape recognition means for recognizing the shape of said polyhedrons based on said range image within said set candidate range (3D plane approximation block 810, staircase shape recognition block 812).

In the above, said photographic means may comprise at least two cameras (CCD cameras 50), and said region selection means selects said predetermined region (staircase candidate region) within image photographed by one of said two cameras, and also said candidate region setting means obtains said range image from the image obtained stereoscopically from said two cameras.

In the above, said region selection means (more specifically, its parallel line grouping block 804) extracts groups of line segments longer than a predetermined length from within said photographed image, and selects said predetermined region based on the positions of said extracted groups of line segments.

In addition, said region selection means (more specifically, its parallel line grouping block 804) selects said predetermined region based on the positions of groups of line segments that are parallel to each other within said extracted groups of line segments, and that are groups of line segments that are close from a distance standpoint.

Said polyhedron shape recognition means extracts sets of points constituting said range image within said candidate region as sets of range data in a three-dimensional space (X, Y, Z space) and recognizes the shape of said polyhedron based on said extracted sets of points.

In addition, said polyhedron is a staircase 82 and also said polyhedron shape recognition means assumes said extracted set of points to be an inclined plane, and thus the shape of said staircase is recognized by finding an approximate plane and more specifically, a plane model 90.

In addition, said polyhedron is a staircase and also said polyhedron shape recognition means sections said extracted set of points along vertical planes (XZ planes), and the shape of said staircase is recognized based on the error between the sets of points on the cross-sectional planes and a two-dimensional staircase model 94.

Note that in the aforementioned embodiment, if the staircase model 92 of FIG. 10 with the staircase position found in model 94 as the initial value is fit to the three-dimensional sets of points within all of the staircase regions of FIG. 16, then the position and shape of the staircase 82 can be found more accurately. In this case, an initial value close to the true value can be set in the processing of the cross-section data, so convergence can be done within a realistic amount of computation.

While the range image may be obtained from a three-dimensional image obtained stereoscopically with two cameras, it is also possible to use a direct range sensing device such as ZCam™ from 3DV Systems of the US or the like to obtain the range image with a single camera. This is why claim 1 recites "at least one camera."

Moreover, while a staircase 82 is given as an example of the polyhedron, this is not a limitation, but rather this may also be a stepladder or the like.

Moreover, while an ordinary staircase is given as an example of the staircase 82, but this may also be a spiral staircase. In this case, in the parallel line grouping block 804, the parallel lines may be replaced with a group of line segments that vary with a regularly shifting angle which are extracted to set the candidate region, and an appropriate model may be used in the 3D plane approximation block 810.

Moreover, the polyhedron recognition system according to this embodiment was described in the example of being installed in a legged walking robot, but it is sufficient for the polyhedron recognition system according to this embodiment to consist of CCD cameras (photographic means) 50 and image processing ECU 80; a legged walking robot is not a requisite component.

Moreover, when the polyhedron recognition system according to this embodiment is installed in another system, the system is not limited to a legged walking robot, wheeled mobile robot, crawler-based mobile robot or other robot, but rather it may also be a vehicle or other mobile unit. In addition, this mobile unit may be either manned or unmanned.

While the invention has thus been shown and described with reference to specific embodiments, it should be noted that the invention is in no way limited to the details of the described arrangements, but changes and modifications may be made without departing from the scope of the appended claims.

What is claimed is:

1. A system for recognizing a shape of a staircase or other polyhedron based on an image input from photographic means, comprising:
    at least one camera as the photographic means;
    region selection means for selecting a predetermined region to be processed further for detailed analysis within the image photographed by the at least one camera;
    processing region setting means for obtaining a range image from the image obtained by the camera and for setting a processing region upon the obtained range image based on the selected region; and
    polyhedron shape recognition means for recognizing the shape of one or more polyhedrons based on the range image within the set candidate range.

2. A system according to claim 1, wherein the photographic means comprises at least two cameras, and the region selection means is configured to select the predetermined region within the image photographed by one of the at least two cameras, and the processing region setting means is configured to obtain the range image from the image obtained stereoscopically from at least two cameras.

3. A system according to claim 1, wherein the region selection means is configured to extract groups of line segments that are longer than a predetermined length from within the photographed image, and to select the predetermined region based on positions of the extracted groups of line segments.

4. A system according to claim 3, wherein the region selection means is configured to select the predetermined region based on the positions of groups of line segments that are parallel to each other within the extracted groups of line segments, wherein the groups of line segments are sufficiently close in distance.

5. A system according to claim 1, wherein the polyhedron shape recognition means is configured to extract sets of points constituting the range image within the processing region as sets of range data in a three-dimensional space and to recognizes the shape of said polyhedron based on the extracted sets of points.

6. A system according to claim 5, wherein the polyhedron is a staircase and the polyhedron shape recognition means are configured to assume the extracted set of points to be an inclined plane, and recognizes the shape of said staircase by finding an approximate plane.

7. A system according to claim 5, wherein the polyhedron is a staircase and the polyhedron shape recognition means is configured to section the extracted set of points along vertical planes, and recognizes the shape of the staircase based on an error between the sets of points on the cross-sectional planes and a two-dimensional model.

8. A method of recognizing a shape of a staircase or other polyhedron based on an image input from at least one camera, comprising:
    selecting a predetermined region within the image photographed by the at least one camera,
    obtaining a range image from the image obtained by at least one camera and setting a processing region upon the obtained range image based on the selected region, and
    recognizing the shape of the polyhedrons based on the range image within a set candidate range.

9. A method according to claim 8, wherein the selecting further comprises selecting the predetermined region within the image photographed by one of at least two cameras, and the obtaining further comprises obtaining the range image from the image obtained stereoscopically from the at least two cameras.

10. A method according to claim 8, wherein the extracting further comprises extracting groups of line segments that are longer than a predetermined length from within the photographed image, and selecting further comprises selecting the predetermined region based on positions of the extracted groups of line segments.

11. A method according to claim 10, wherein the selecting further comprises selects the predetermined region based on the positions of groups of line segments that are parallel to each other within the extracted groups of line segments, wherein the groups of line segments are sufficiently close in distance.

12. A method according to claim 8, wherein the extracting further comprises extracting sets of points constituting the range image within the processing region as sets of range data in a three-dimensional space and the recognizes further comprises recognizing the shape of said polyhedron based on the extracted sets of points.

13. A method according to claim 12, wherein the polyhedron is a staircase and the extracted set of points is assumed to be an inclined plane, and the recognizing further comprises recognizing the shape of said staircase by finding an approximate plane.

14. A method according to claim 12, wherein the polyhedron is a staircase and the extracted set of points is sectioned along vertical planes, and the recognizing further comprises recognizing the shape of the staircase based on an error between sets of points on cross-sectional planes and a two-dimensional model.

15. A computer program embodied on a computer-readable storage medium for recognizing shape of a staircase or other polyhedron based on an image input from at least one camera, the program configured to control a processor to perform a process, the process comprising:

selecting a predetermined region within the image photographed by the at least one camera;

obtaining a range image from the image obtained by the at least one camera and setting a processing region upon the obtained range image based on the selected region; and recognizing the shape of one or more polyhedrons based on the range image within a set candidate range.

* * * * *